No. 658,487. Patented Sept. 25, 1900.
A. W. KENT.
VEHICLE WHEEL RIM.
(Application filed Sept. 18, 1899.)
(No Model.)
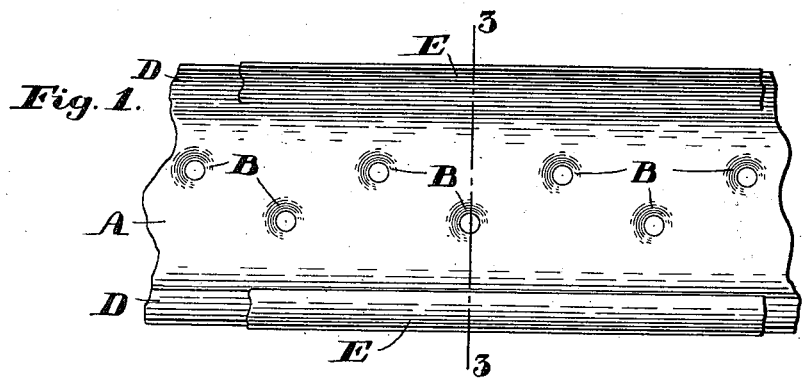
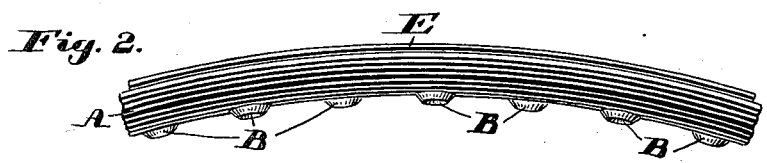
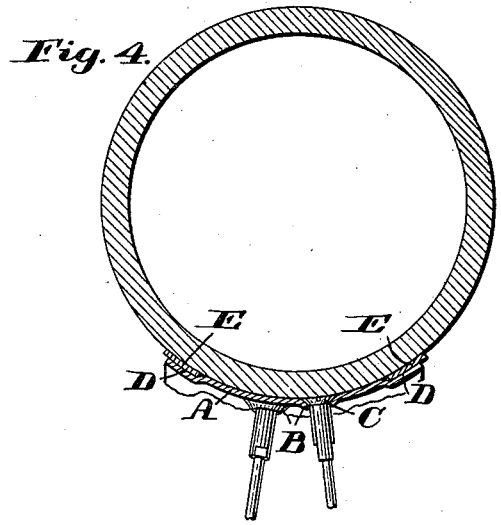
WITNESSES:
Charles F. Logan.
N B Marston
INVENTOR.
Alexander W. Kent
BY
N A Spencer
ATTORNEY.
THE NORRIS PETERS CO., PHOTO-LITHO., WASHINGTON, D. C.

UNITED STATES PATENT OFFICE.

ALEXANDER W. KENT, OF BOSTON, MASSACHUSETTS.

VEHICLE-WHEEL RIM.

SPECIFICATION forming part of Letters Patent No. 658,487, dated September 25, 1900.

Application filed September 18, 1899. Serial No. 730,815. (No model.)

*To all whom it may concern:*

Be it known that I, ALEXANDER W. KENT, of Boston, in the county of Suffolk and State of Massachusetts, have invented certain new and useful Improvements in Vehicle-Wheel Rims, of which the following is a specification.

The object of this invention is to provide an improved wheel-rim for automobiles, bicycles, and other wheeled vehicles, my purpose being to lighten, stiffen, and strengthen the rim and provide against cutting the elastic tire along the line of contact with the edges of the wheel-rim.

My improvement is embodied in a metal wheel-rim having a concave peripheral face with a succession of hollow bosses depressed in such concave face and protruding correspondingly on the convex face or inner side of such rim, each boss being open centrally through the metal to admit the nipple which connects the rim to the spoke of the wheel.

My improved wheel-rim is formed with a slight outward trough-like depression along each of its margins, each provided with a strip of felt or other yielding material secured in place and extending to or slightly beyond the edge of the rim, preferably slightly overlapping it, so as to constitute a cushion interposed between the rim and the elastic tire and serving to greatly relieve the wear upon the tire along these lines of pressure. The formation of these bosses and marginal troughs serves to stiffen the wheel-rim and enable it the better to withstand the strain of use, at the same time permitting the use of lighter metal, thus lessening the weight of the wheel to an appreciable extent. The hollow bosses struck up and open through the rim along each side of its central line retain the full strength and preserve the skin or outer surface of the metal, thereby increasing the endurance of the metal at a point where the particular strain comes and contrasting favorably with the ordinary practice of countersinking holes through the metal, whereby the rim is much weakened with no compensating advantage, the metal being brought to a feather-edge and its toughest part cut away, so that the nipple-heads pull through.

In the drawings, Figure 1 is a plan of a portion of my improved wheel-rim, showing its concave face. Fig. 2 is an edge view thereof. Fig. 3 is a cross-section of the same; and Fig. 4 a transverse section through the rim and a rubber tire, showing the relation of the parts to each other.

A represents the metal rim, and B the series of bosses struck up in and through the concavity of the rim in a zigzag line and having walls of substantially-uniform thickness corresponding with other portions of the rim. Into these hollow bosses the head C of the connecting-nipple is received, being sunken therein, so as not to press unduly upon the adjacent portion of the rubber tire. The thickness of the bosses being uniform, the full strength of the metal is retained, and the wheel having a rim formed under this construction is materially strengthened and stiffened.

D D are depressions or longitudinal troughs along the edges of the rim, formed by bending the metal somewhat outwardly along a line parallel with each edge to a distance about equal to the thickness of the metal and continuing thence upwardly on about the same curve as before, thus forming an offset or strengthening-bead which materially stiffens the rim, at the same time providing a seat along each edge for the yielding cushion E. These cushions E are preferably strips of firm felt or of vulcanized rubber having a backing of cotton-duck and are cemented or otherwise secured in the trough, so as to slightly overlap the edges of the rim and prevent them from cutting the elastic tire.

It will be seen that my improved rim is braced and stiffened at its edges by the beads or troughs D and along its center by the succession of bosses B, the thick walls of which stand oblique to the lines of strain or pressure.

I claim as my invention—

1. The described improvement in vehicle-wheels, consisting in a metallic wheel-rim formed complete of a single piece having a concave peripheral face and at each side of its central line, a series of hollow struck-up bosses arranged in a zigzag line, and having walls of equal thickness with the rim, forming depressions in its concave face and corresponding protuberances on its convex face, open centrally to receive and form seats for the heads of the spoke-nipples, substantially as set forth.

2. The described improvement in wheel-rims, consisting in the annular metallic body A having a concave peripheral face with marginal trough-like seats D offset along its edges leaving the metal of uniform thickness throughout, and yielding cushion-strips E of uniform thickness secured in such seats and overlapping the edges of the rim, substantially as set forth.

3. The improved wheel-rim described, having the metallic body A peripherally concave, formed with a succession of open, hollow, struck-up bosses B, having walls of the full thickness of the metal protruding on the inner face of the rim, the axes of such bosses being oblique to the plane of the wheel and alternately reversed, such rim being formed with marginal seats D D offset about the thickness of the metal and extending outwardly in a line parallel with the transverse curvature of the rim, and provided with yielding cushion-strips E secured in said seats, substantially as set forth.

In testimony whereof I have affixed my signature in presence of two witnesses.

ALEXANDER W. KENT.

Witnesses:
A. H. SPENCER,
CHARLES F. LOGAN.